UNITED STATES PATENT OFFICE 2,475,729

PYRIDINE DERIVATIVES, DERIVED FROM β-IONONE

David Adriaan van Dorp and Josef Ferdinand Arens, Oss, Netherlands, assignors to N. V. Organon, Oss, Netherlands, a firm No Drawing. Application February 5, 1946, Serial No. 645,700. In the Netherlands September 7, 1945

6 Claims. (Cl. 260—240)

This invention relates to certain pyridine derivatives derived from β-ionone which are characterized by the general formula

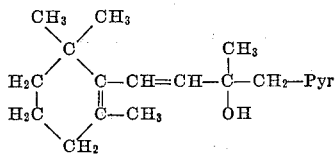

in which Pyr stands for a group from the class consisting of the pyridyl group $C_5H_4N$ and the methylpyridyl group $CH_3$—$C_5H_3N$ and to the compounds, which may be obtained from the compounds stated above by splitting off one molecule of water and which are characterized by the general formula

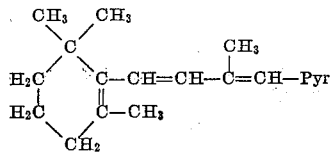

in which Pyr has the same meaning as above.

These new compounds are obtained by reacting β-ionone

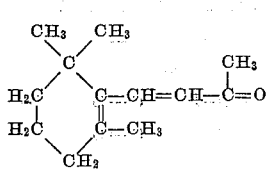

with a methylated pyridine derivative of the general formula $CH_3Pyr$, in which Pyr stands for a group selected from the class consisting of the pyridyl group $C_5H_4N$ and the methylpyridyl group $CH_3$—$C_5H_3N$. From the compounds of the general Formula I which are obtained as a product of this reaction water may be split off, resulting in the production of compounds with the general Formula II.

The reaction between β-ionone and the pyridine derivative may be brought about by reacting the components under the catalytic influence of zinc chloride or some other catalyst acting in an analogous way. Another way of effecting the condensation consists of preparing the alkali compound of the methylated pyridine derivative used, e. g. the lithium compound, and reacting this with β-ionone.

The compounds obtained by the process of the invention are useful intermediates in the synthesis of vitamin A and related compounds. Some of the compounds obtained possess themselves pharmacological properties, e. g. as analeptics.

The following examples may serve to illustrate our invention. It is to be understood, however, that the invention is not limited thereto, but may be varied within the scope of the appended claims.

*Example 1.—Condensation of β-ionone with α-picoline*

In a three-neck flask, provided with mechanical stirrer, dropping funnel, reflux condenser and gas inlet tube, the air is replaced by pure nitrogen. Then 45 cc. of abs. ether and 1.1 g. of lithium cut into small pieces are introduced. A mixture of 13 g. of freshly distilled bromobenzene and 15 cc. of absolute ether is added. The first 5 cc. of this mixture are added at a high speed, the rest at such a speed, that the ether in the flask keeps boiling gently. After all has been added, the stirring is continued for half an hour. The lithium then must be completely dissolved. Now in five minutes a mixture of 10 g. of α-picoline and 5 cc. of abs. ether is added dropwise. The solution is coloured dark yellow. After ten minutes to the ethereal solution of picolyl lithium which is obtained in this way a mixture of 9 g. of β-ionone and 10 cc. of abs. ether is added dropwise in about ten minutes. After refluxing for another half hour the mixture is left at room temperature for an hour. Then the dark brown liquid is poured out on ice, at which the dark colour disappears at once. The ether layer is agitated with an excess of icecold 1 n. hydrochloric acid. The picolylionone passes over into the aqueous liquid. The water layer is washed with ether, then made slightly alkaline. The mixture is extracted with ether, the ether layer is washed, dried and distilled in high vacuum.

8 g. of picolylionone is obtained. It is a pale yellow, viscous oil which distills at a pressure of 0.001 m. m. between 135° and 142° C. On standing the oil slowly crystallizes. The melting point is 41°–46° C. after pressing out on filter paper.

By heating at 65°–70° C. of 5 g. of the picolylionone with 8 g. of finely powdered anhydrous oxalic acid during 3 hours in an atmosphere of carbon dioxide anhydro-picolylionone is obtained. The reaction product is agitated with an excess of caustic soda, the remaining oil is taken up into ether, washed, dried and distilled. The fraction that boils above 110° C. (0.01 m. m.) is taken up into ethanol and treated with an excess of a solution of picric acid in ethanol. The picrate of anhydro-picolylionone which crystallizes is purified by recrystallisation from ethanol. Pale yellow crystalplates are obtained, melting at 155° C. (corr.). The recovered base is a thick oil.

*Example 2.—Condensation of β-ionone with 2,4-dimethylpyridine (lutidine)*

In an analogous way as described in Example 1 from 7.4 g. of lithium, 300 cc. of absolute ether and a mixture of 86.6 g. of bromobenzene with 90 cc. of ether a solution of phenyl lithium is prepared. A mixture of 61 cc. of freshly distilled 2,4-dimethylpyridine and 60 cc. of ether is added dropwise. After ten minutes a mixture of 60 g. of β-ionone and 60 cc. of ether is slowly added, while cooling in ice. The reaction mixture is left at room temperature for 1½ hours, after which it is further treated as described in Example 1. The yield is 80 g. of lutidylionone, boiling at 136°–143° C./0.001 m. m. It likewise crystallizes and melts at 44°–51° C. When tested biologically it shows analeptic properties.

With the aim of preparing anhydro-lutidylionone a mixture of 10 g. of lutidylionone and 16 g. of powdered anhydrous oxalic acid is heated in a vacuum of 1 m. m. in an oil bath, which is kept at 110° C. for half an hour. After that the mass is kept at 80° C. for another ¾ hour. After working up as described in Example 1 5.9 g. of anhydro-lutidylionone is obtained as a yellow oil, boiling at 140°–147° C. under a pressure of 0.01 m. m. After treatment with picric acid two picrates may be obtained: a pale yellow picrate, melting at 166° C. (corr.), which forms the chief product, and a dark yellow picrate, melting at 156° C. (corr.). The two picrates are derived from two isomeric anhydro-lutidylionones, having the following structural formulas:

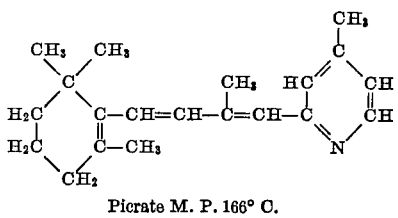

Picrate M. P. 166° C.

and

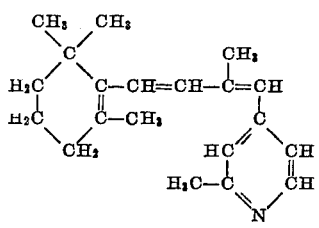

Picrate M. P. 156° C.

What we claim is:
1. The compound

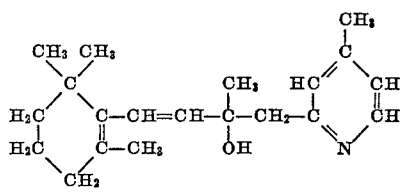

2. Compounds of the general formula

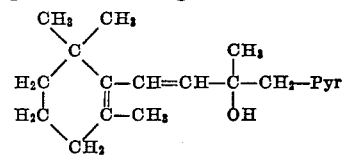

in which Pyr stands for a group selected from the class consisting of the α-pyridyl group

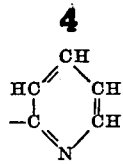

the γ-methyl α-pyridyl group

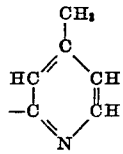

the γ-pyridyl group

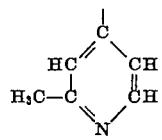

and the α-methyl-γ-pyridyl group

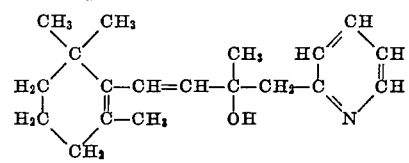

3. The compound

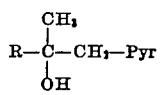

4. The process of preparing compounds of the general formula

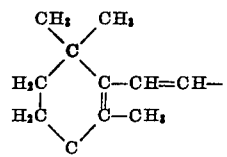

in which R stands for the group

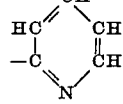

and Pyr stands for a group selected from the class consisting of the α-pyridyl group

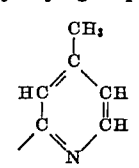

the γ-methyl α-pyridyl group

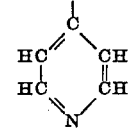

the γ-pyridyl group and the α-methyl γ-pyridyl group

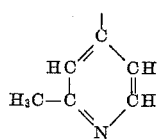

which consists of first preparing a lithium derivative of a compound of the formula CH₃—Pyr by interaction of a compound CH₃—Pyr with an organolithium compound, reacting the resulting lithium derivative with β-ionone

decomposing the reaction product with an aqueous liquid and isolating the compound

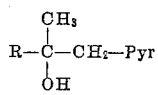

obtained.

5. The process of preparing a compound of the formula

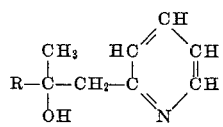

according to claim 4 which consists of reacting β-ionone with a lithium derivative of α-picoline, decomposing the reaction product with an aqueous liquid and isolating the resulting compound.

6. The process of preparing a mixture of compounds of the formula

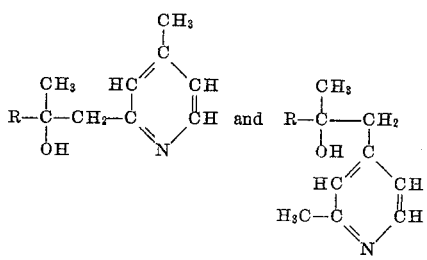

according to claim 4 which consists of reacting β-ionone with a lithium derivative of 2,4-dimethyl pyridine, decomposing the reaction product with an aqueous liquid and isolating the resulting mixture.

DAVID ADRIAAN van DORP.
JOSEF FERDINAND ARENS.

REFERENCES CITED

The following references are of record in the file of this patent:

Maier, "Das pyridine und seiner derivatives," p. 44, 31 (1934).

Feiser, "Organic Chemistry," 1944, page 1000.